(12) United States Patent
Moore et al.

(10) Patent No.: US 11,803,515 B2
(45) Date of Patent: Oct. 31, 2023

(54) DEFRAGMENTATION IN DEDUPLICATION STORAGE SYSTEMS

(71) Applicant: International Business Machines Corporation, Armonk, NY (US)

(72) Inventors: Roderick Guy Charles Moore, Bournemouth (GB); Denis Alexander Frank, Winchester (GB); Lee Jason Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 17/487,615

(22) Filed: Sep. 28, 2021

(65) Prior Publication Data
US 2023/0108949 A1 Apr. 6, 2023

(51) Int. Cl.
*G06F 16/174* (2019.01)
*G06F 16/17* (2019.01)

(52) U.S. Cl.
CPC ...... *G06F 16/1724* (2019.01); *G06F 16/1734* (2019.01); *G06F 16/1752* (2019.01)

(58) Field of Classification Search
CPC .......................................... G06F 16/174–1756
See application file for complete search history.

(56) References Cited

U.S. PATENT DOCUMENTS

| | | | |
|---|---|---|---|
| 8,527,544 B1 * | 9/2013 | Colgrove | G06F 3/0641 707/791 |
| 8,751,454 B1 | 6/2014 | Bushman | |
| 9,928,210 B1 | 3/2018 | Zhang | |
| 10,430,102 B2 | 10/2019 | Kaczmarczyk | |
| 2011/0307447 A1 * | 12/2011 | Sabaa | G06F 16/1744 707/693 |
| 2012/0131025 A1 * | 5/2012 | Cheung | G06F 16/1752 707/755 |
| 2012/0158671 A1 * | 6/2012 | Tzur | G06F 16/1748 707/E17.005 |
| 2013/0318051 A1 * | 11/2013 | Kumar | G06F 16/137 707/692 |
| 2014/0101114 A1 * | 4/2014 | Akirav | G06F 16/1752 707/E17.002 |
| 2020/0311030 A1 | 10/2020 | Natanzon | |

OTHER PUBLICATIONS

Mell, et al., The NIST Definition of Cloud Computing, National Institute of Standards and Technology, U.S. Department of Commerce, NIST Special Publication 800-145, Sep. 2011, 7 pages.

\* cited by examiner

*Primary Examiner* — Robert W Beausoliel, Jr.
*Assistant Examiner* — Nirav K Khakhar
(74) *Attorney, Agent, or Firm* — Michael A. Petrocelli

(57) ABSTRACT

Disclosed are techniques for defragmentation in deduplication storage systems. Machine language determines using deduplication metadata that at least some of an incoming input/output stream is a duplicate of at least part of a source volume whose physical locations of its stored data are fragmented in backend storage. Subsequently, defragmentation is carried out on the stored data by using the incoming input/output stream to write the data into sequential chunks at new physical locations in the backend storage and updating the source volume location mappings to the new physical locations.

20 Claims, 9 Drawing Sheets

DEFRAGMENTATION IN DEDUPLICATION STORAGE SYSTEMS

BACKGROUND

The present invention relates to storage systems, and more specifically, to defragmentation in deduplication storage systems.

A common feature found in storage controllers and appliances today is data deduplication. There is an ever increasing demand to store more user data with the same physical capacity, which reduces the overall cost of ownership of the storage system. Data deduplication works by identifying repeated data patterns and instead of storing the user data, it will create a reference to the duplicate data that is stored elsewhere in the system. It may be that the existing duplicate is within the same volume, another volume either in the same pool or another pool within the storage system, or within a volume used by another host.

In a deduplication storage system, there is a forward lookup that describes the virtual to physical mapping, typically using a B-Tree. A source chunk is a chunk of data that stores the original copy of the data, a referrer chunk is a symbolic link to the source chunks data. The source chunk contains a count of the number of referrers that are referring back to the source. The source chunk knows how many chunks are referring to it, but it does not know which chunks.

Use cases for data duplication in storage systems include, for example, a virtual machine boot operating system image that is used by multiple hosts. In this case, the host operating system may well be the same version and therefore it would be a waste to store N copies of that data. The granularity of deduplication can differ between storage products, but typically it will be small such as 8 kilobytes and the scope of the deduplication will be at a volume or storage pool level.

Data deduplication and reduction systems may use a Log Structured Array (LSA) as a directory to locate data in an array of physical disks. The benefit of using an LSA is that random data can be written sequentially. The benefit here is that it overcomes typical Random Array of Inexpensive Disks (RAID) write penalties by grouping together the data as one large sequential write to the storage array which negates the need for parity updates. The downside of this approach is that if data was originally written randomly, sequential access requires random access to the array, which, depending on the transfer size of the host JO, may require many small read IOs. This is known as fragmentation of the data.

LSAs typically do not overwrite the data in-place, particularly if compression is used because the size of the new data may not match the original size. Overwrites of existing data are placed at a free location. A garbage collector then invalidates the original data and updates any references to it within the B-Tree. Overtime, this will cause data to be fragmented in a similar manner due to holes of invalidate areas within the written data. The garbage collector's job is to collect valid data and group it together into a new location, so large areas of free space can be reused.

Write streams and garbage collection do not make any attempt to create sequential data. Indeed, the act of garbage collection and multiple overwrites may create very fragmented data that could make for inefficient reads where data would be better read sequentially.

SUMMARY

According to an aspect of the present invention there is provided a computer-implemented method for defragmentation in deduplication storage systems, comprising: determining using deduplication metadata that at least some of an incoming input/output (JO) stream is a duplicate of at least part of a source volume; determining using logical address metadata that the physical locations of the part of the source volume are fragmented in backend storage; and performing defragmentation of the stored data by using the incoming IO stream to write the data into sequential chunks at new physical locations in the backend storage and updating the source volume location mappings to the new physical locations.

According to another aspect of the present invention there is provided a system for defragmentation in deduplication storage systems, comprising: a processor and a memory configured to provide computer program instructions to the processor to execute the function of the components: a deduplication determining component for determining using deduplication metadata that at least some of an incoming input/output (JO) stream is a duplicate of at least part of a source volume; a fragmentation determining component for determining using logical address metadata that the physical locations of the part of the source volume are fragmented in backend storage; and a defragmentation performing component for performing defragmentation of the stored data by using the incoming IO stream to write the data into sequential chunks at new physical locations in the backend storage and updating the source volume location mappings to the new physical locations.

According to a further aspect of the present invention there is provided a computer program product for defragmentation in deduplication storage systems, the computer program product comprising a computer readable storage medium having program instructions embodied therewith, the program instructions executable by a processor to cause the processor to: determine using deduplication metadata that at least some of an incoming input/output (JO) stream is a duplicate of at least part of a source volume; determine using logical address metadata that the physical locations of the part of the source volume are fragmented in backend storage; and perform defragmentation of the stored data by using the incoming IO stream to write the data into sequential chunks at new physical locations in the backend storage and updating the source volume location mappings to the new physical locations.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are provided for performing defragmentation in a deduplicated storage system by using logical to physical address metadata to detect fragmentation of data and using inbound data to reorganize existing fragmented data into a sequential stream.

Deduplication metadata is used to determine that at least some of an incoming write stream is a duplicate of at least part of a source volume and logical address metadata is used to determine that the physical locations of its stored data are fragmented in backend storage. The deduplication metadata is used in this way to identify data that is written in a random order in the backend storage.

Defragmentation of the stored data is performed by using the incoming write stream to write the data into sequential chunks at new physical locations in the backend storage and to update the source volume location mappings in the duplication metadata to the new physical locations.

The defragmentation process is integrated into a host write operation and enables defragmentation of data without the need to read data from backend storage as the write has the required data in the node memory. The method provides an inline synchronous defragmentation of the data as the data enters the system on the fly.

A sequential write stream finds random physically stored deduplication data that is all logically resident in the same deduplication source volume. Writing the sequential data stream includes updating the previous random data locations with deduplication links to the new sequential data. In this way, the method gradually turns random fragmented data into sequential data by making use of sequential host workloads.

As an example, a backup copy is a sequentially written copy of data that may have been previously written in random order. In this case, the sequential write stream will find random deduplication data all resident in the same deduplication source volume.

Unlike other post-processing defragmentation schemes, as this defragmentation process is naturally integrated in the host write operation it does not introduce an unexpected performance overhead. The described method and system also have the advantage of maintaining the deduplication ratio of the storage.

Figure 1:
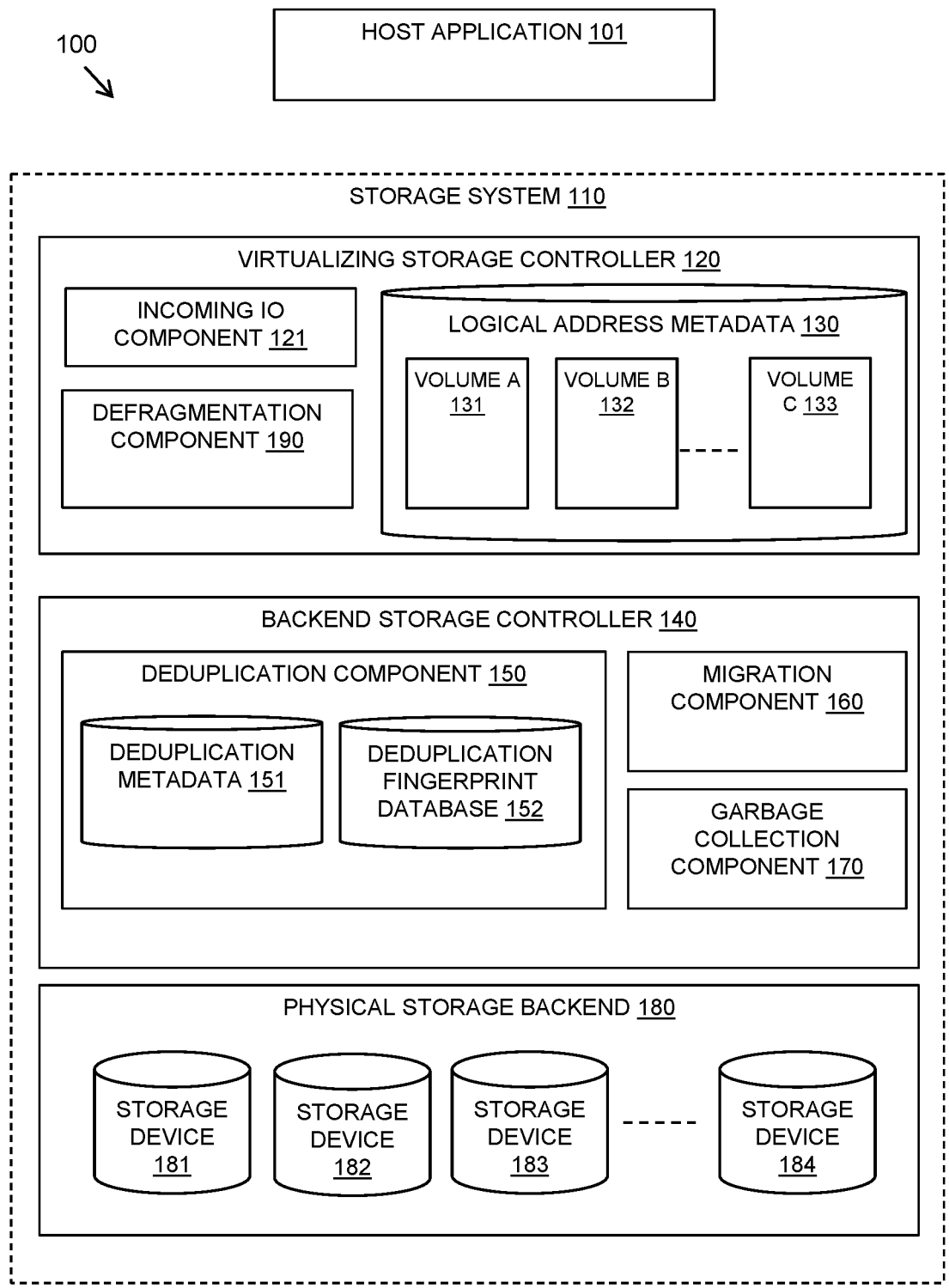
FIG. 1 is a block diagram of an example embodiment of a system in which the present invention may be implemented.

Referring to FIG. 1, a schematic diagram 100 illustrates an example embodiment of a storage system 110 in which the described method and system may be implemented. The arrangement of the components of the system is illustrative and should not be considered limiting to possible embodiments.

The storage system 110 provides storage for host applications 101 at one or more host servers having storage interfaces through which input/output (JO) operations are handled for writing and reading data to and from the storage system 110.

The storage system 110 includes a virtualizing storage controller 120 providing a virtualizing layer. The virtualizing storage controller 120 includes an incoming IO component 121 for receiving host IO operations from host applications 101 to logical volumes 131-133 of logical address metadata 130 providing logical to physical address mappings thereby enabling virtualization of the storage area.

The virtualizing storage controller 120 may maintain a log-structure array (LSA) structure which is used to describe the logical-to-physical layout of block devices in a storage system. LSA structures are used in storage systems because they offer an easy way to implement many different data reduction techniques and are agnostic about the type of storage backend 180. LSA storage systems use logical block addressing of logical block addresses (LBAs) in a virtual domain to reference physical addresses at the storage backend 180. The host application 101 only needs to provide the LBA without knowing anything of the physical backend. A storage pool may be allocated at the virtualizing storage controller 120 for a host application 101.

The storage system 110 includes a backend storage controller 140 and a physical storage backend 180. The physical storage backend 180 provides physical disk storage across an array of physical devices 181-184 of non-volatile storage media. A managed disk is maintained by the backend storage controller 140 as a logical unit of physical storage that is not visible to a host and which is divided into chunks of equal size. The chunks are a unit of mapping that provides a logical connection between managed disks and volume copies.

The backend storage system controller 140 may also include functionality such as a migration component 160 for controlling migration of the stored data and a garbage collection component 170 for garbage collection of storage extents in the physical storage backend 180.

The backend storage controller 140 includes a deduplication component 150 for deduplication of data stored at the physical storage backend 180. Deduplication is a well-known technique that is used for removing duplications from stored chunks of data by pointing to a stored chunk using deduplication metadata 151. The deduplication process begins by creating a unique digital fingerprint or signature for a given chunk of data by applying a hash function. This fingerprint value is saved in an indexed fingerprint database 152 so it can be compared to fingerprint values that are created for new incoming data chunks. By comparing fingerprint values, it is determined if a chunk of data is unique or if it is a duplicate of an already stored data block. Deduplication metadata 151 provides mappings to the address of the stored data blocks.

The described system includes a defragmentation component 190 that intercepts incoming IO write streams from a host application 101 to determine if defragmentation of the physical locations of the data of the write stream is required using deduplication metadata 151 and logical address metadata 130. Once, triggered, the defragmentation component 190 writes data into new sequential chunk locations at the physical storage backend 180 and updates source volume location mappings in the deduplication metadata 151 to point to the new physical locations.

Figure 2A:
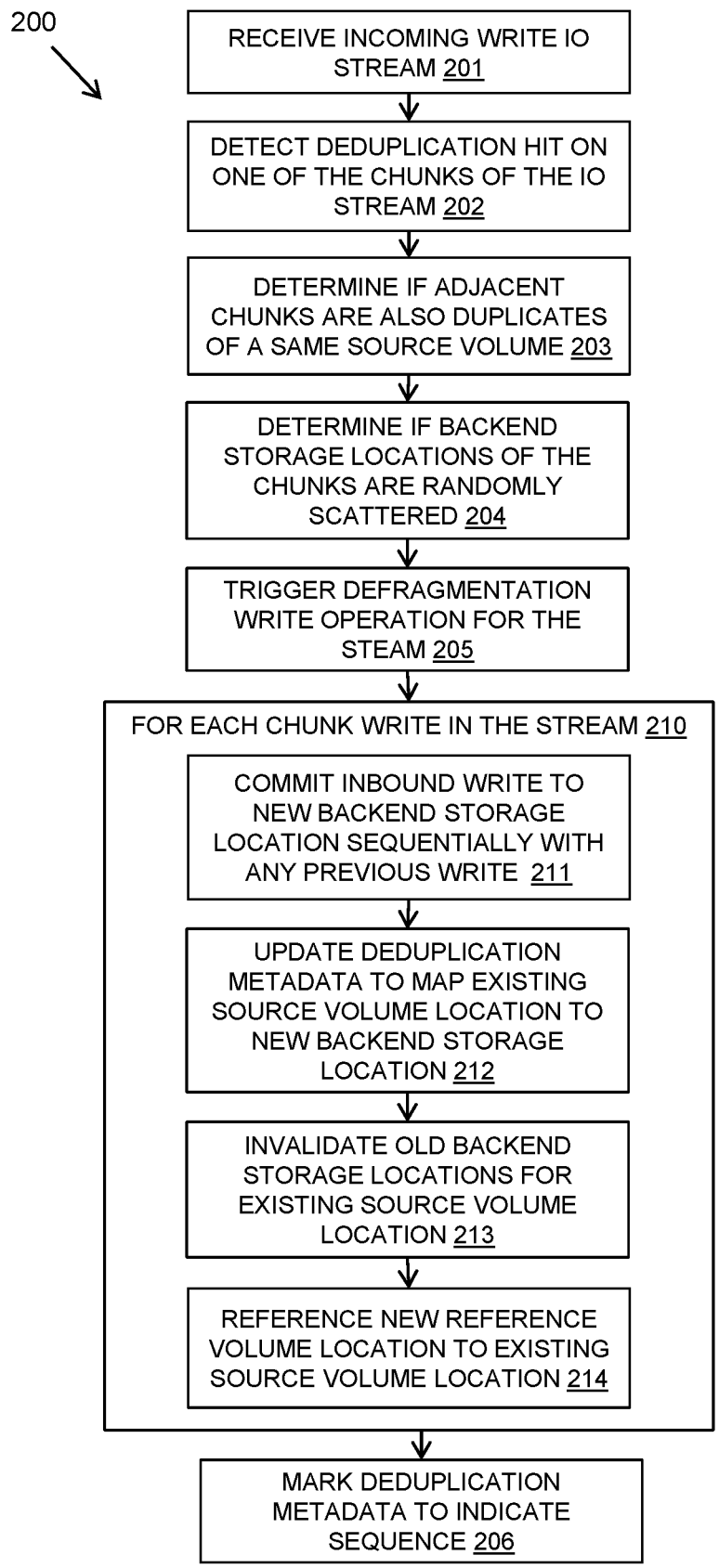
FIGS. 2A and 2B are flow diagrams of aspects of an example embodiment a method in accordance with the present invention.

Referring to FIG. 2A, a flow diagram 200 shows an example embodiment of the described method for an incoming write stream of IO operations.

The method may receive 201 an incoming write stream of IO operations formed of multiple chunks of data of deduplication grain size. This may be any large write (for example, greater than 256 kilobytes) which is greater than the deduplication grain size. The workload itself may not necessarily need to be sequential if the write is large enough to include multiple of the smaller deduplicated chunks that are written randomly. The write stream may be, for example, a large IO stream operation, such as a sequential copy of a volume.

The method may detect 202 a deduplication hit on one of the chunks of the write stream and may determine 203 using deduplication metadata that at least some of the incoming write stream is a duplicate of at least part of a source volume. This may be determined from deduplication metadata of the adjacent chunks of the write stream. A threshold number of adjacent deduplication chunks may be applied depending on configured implementations.

The method may also determine 204 using logical address metadata that the physical locations of the part of the source volume are fragmented in backend storage. This may be determined if the backend storage locations of the multiple chunks of the write stream are randomly scattered. The logical address metadata (for example, the LSA) that is used to map logical to physical address may be used to look at the sequential logical layout of the data verses the randomness of the physical data that has been used for the existing data.

If the incoming write stream is a duplicate of at least part of a source volume and the physical locations of the part of the source volume are fragmented in backend storage, this may trigger 205 a defragmentation process during the write operation of the write stream. The trigger 205 may be based on a threshold which is implementation dependent to suit a system as a tradeoff between defragmentation or not. Detection of a defragmentable portion of the data may be done at any point in the inbound data stream.

The method may carry out the following method 210 for each chunk write in the incoming write stream once the defragmentation method has been triggered and until deduplication hits are no longer achieved for the incoming write chunks or the potential defragmentation no longer satisfies the system threshold.

The method may commit 211 the inbound chunk write to a new backend storage location sequentially with any previous chunk writes. A first chunk may be allocated a new backend storage location and subsequent chunk writes may be allocated new backend storage locations sequentially with a previous chunk write.

The method may update 212 deduplication metadata to map an existing source volume location for the chunk to the new backend storage location for the chunk. The old backend storage location may be invalidated 213 for the existing source volume location.

The new reference volume location may reference 214 the existing source volume location in the deduplication metadata and the count of references to the existing source volume location may be incremented.

In this way, sequential backend writes are written, whilst keeping the same source volume locations for the chunks. New reference volume locations for the incoming write stream reference the source volume locations for the chunks. The inbound write data stream is used to reorganize existing fragmented physical data locations into a sequential stream in the backend storage.

Markers may be added 206 to the deduplication metadata to indicate how much of the data was written in a single sequence, such that subsequent writes would not remove the data or could chose to move again if longer sequential data streams are detected.

Conventional inline deduplication will preserve the original random order of the data, and replace the sequential write with deduplication links. In the described method, the sequential data stream is written and the previous random data locations are updated with deduplication links to new sequential data locations.

Sequential read IO operations to volumes that discover the source is written randomly, may apply the same approach by using standard sequential read detect techniques. The data may be staged into node memory and therefore the method avoids any penalty of rereading the data just to perform a defragmentation operation. However, in this case a defragmentation write operation may be introduced where the host only performs a read operation. Since read bandwidth requirements are typically different from write bandwidth, this defragmentation may not always be applicable on sequential read streams. A defragmentation on a read operation may therefore be optional dependent on the free resources in the system at the time of the detection.

Figure 2B:
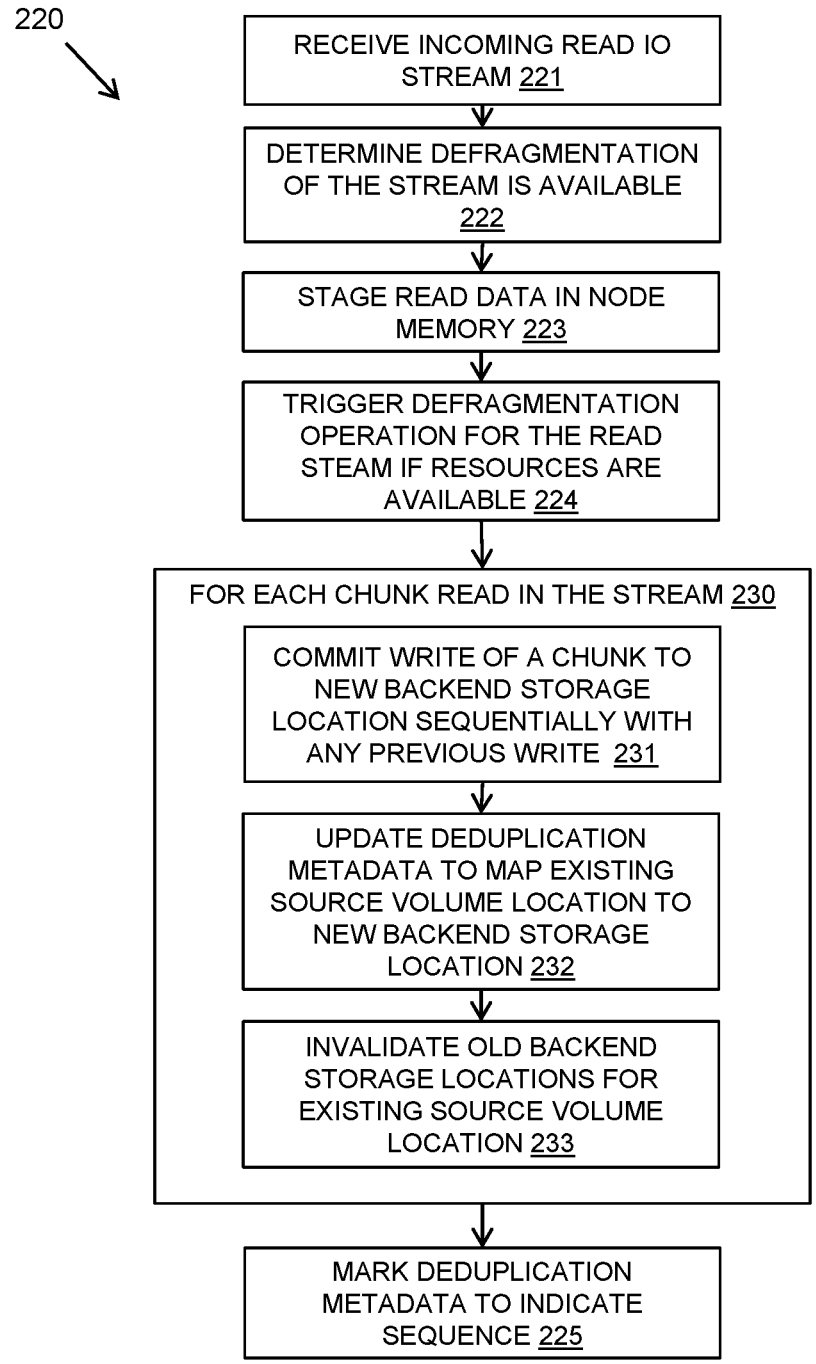

Referring to FIG. 2B, a flow diagram 220 shows an example embodiment of the described method for an incoming read stream of IO operations.

The method may receive 221 an incoming read stream of IO operations formed of multiple chunks of data. The method may determine 222 that a defragmentation of the stream of data being read is available. This may use the same method as described in the flow of FIG. 2A of detecting 202, 203 deduplication hits on adjacent chunks in the stream and determining 204 that the backend storage locations are randomly scattered.

The read data may be staged 223 in node memory for the read stream operation. A defragmentation operation may be triggered 224 for the read stream of data if resources are available using the staged read data.

The method may carry out the following method 230 for each chunk of read data of the read stream once the defragmentation method has been triggered and until deduplication hits are no longer achieved for the incoming read chunks.

The method may commit 231 a chunk of the staged read data stream to a new backend storage location sequentially with any previous chunks of the steam. A first chunk write may be allocated a new backend storage location and subsequent chunks may be allocated new backend storage locations sequentially with a previous chunk write.

The method may update 232 deduplication metadata to map an existing source volume location for the chunk to the new backend storage location for the chunk. The old backend storage location may be invalidated 233 for the existing source volume location. Markers may be added 225 to the deduplication metadata to indicate how much of the data was written in a single sequence, such that subsequent writes would not remove the data or could chose to move again if longer sequential data streams are detected.

Figure 3A:
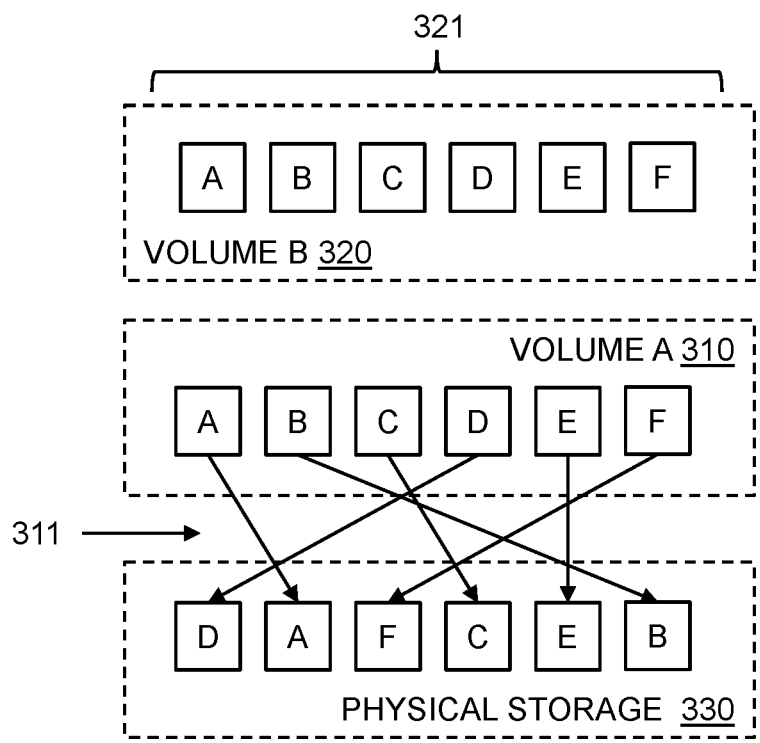
FIGS. 3A to 3C are schematic diagrams illustrating an example embodiment of a method in accordance with the present invention.
Figure 3B:
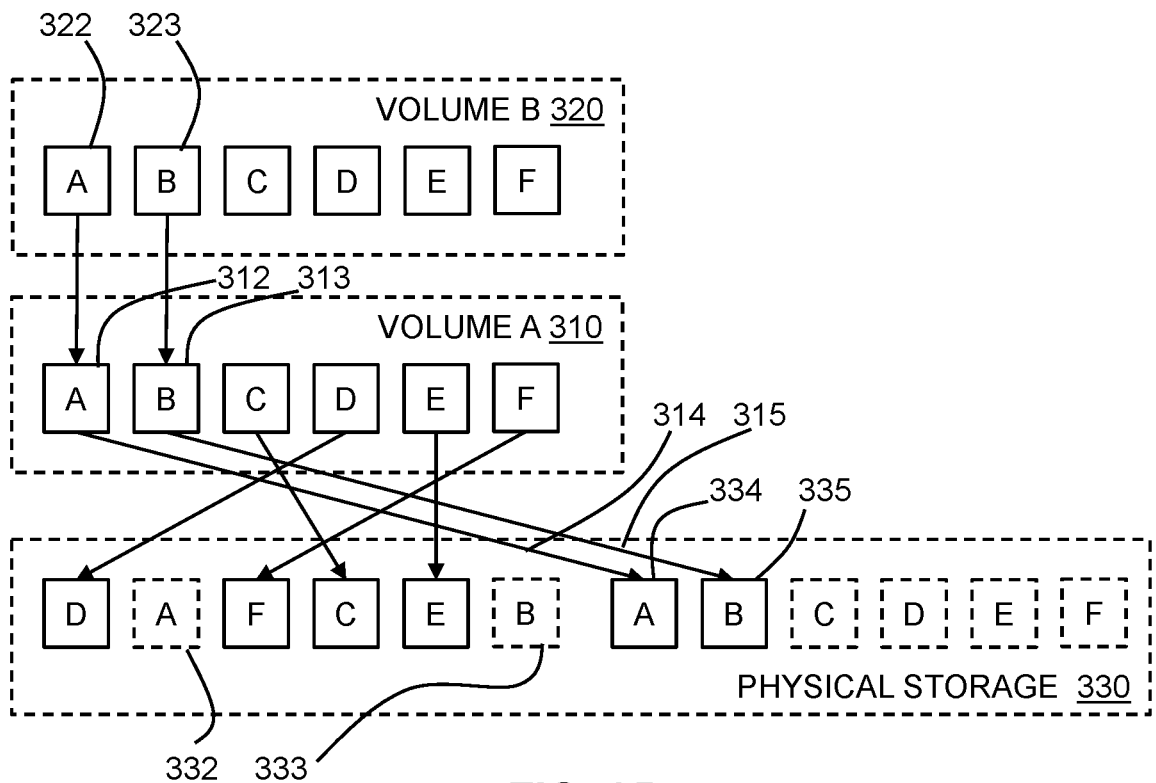
Figure 3C:
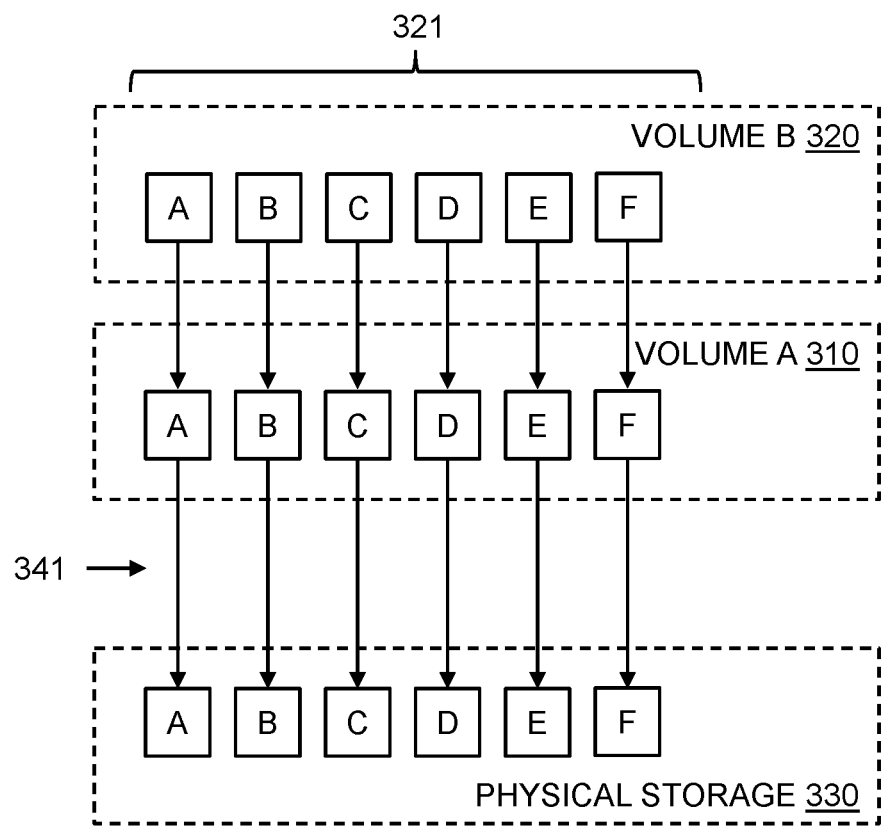

Referring to FIGS. 3A to 3C, schematic diagrams illustrate the described method when writing an incoming write stream. An incoming write stream 321 to Volume B 320 is received formed of sequential chunks A, B, C, D, E, F. The large inbound write of multiple chunks may hit deduplication hits across a set of random data chunks on Volume A 310. Volume A 310 is the existing deduplication source volume for the sequential chunks A-F, with the chunks having backend physical storage 330 locations that are fragmented. Volume B 320 may be a separate volume or a separate location on Volume A 310.

FIG. 3A shows Volume A 310, the existing deduplication source volume for the sequential chunks A-F, with initial physical storage location mappings 311 from the sequential logical chunks to physical storage 330 locations that are randomly placed in the storage. Existing source Volume A 310 contains data written in random fashion either due to initial write or by nature of overwrites and subsequent garbage collection of data.

FIG. 3B shows the write operations for chunk A 322 and chunk B 323 of Volume B 320. Chunks A 322 and B 323 have deduplicate hits with chunks A 312 and B 313 of Volume A 310. The write operations for chunk A 322 and chunk B 323 are committed to new backend storage locations A 334, B 335. Instead of being linked to the volume locations A 322, B 323 of Volume B 320 in deduplication metadata, the Volume A 310 locations A 312, B 313 are updated to be mapped 314, 315 to the new backend storage locations A 334, B 335.

The old data locations in the physical storage 332, 333 for Volume A 310 are invalidated. Existing referrers to Volume A 310 deduplication metadata (for example, in the B-Tree) do not need to be updated as the reference counts, etc. are all still valid, only the location of the actual data has changed.

The deduplication metadata for A 322 of Volume B 320 is then updated to point to A 312 in Volume A 310 as it would have if the original deduplication references had been used.

FIG. 3C illustrates the storage arrangement once all the chunks of the incoming write stream 321 of Volume B 320 have been written. Volume A 310 has now moved to a sequentially stored data stream 341 instead of its original random data.

Using the described method may be used for sequential copies such as backups of volumes that typically come in large IO operations, for example 256Kb, and which span several deduplication grains, for example 8Kb on the source volume. If deduplication detects a hit on one of the grains, it can immediately determine the adjacent grains and whether the entire host write is a duplicate of the source area. The described method can further check whether the storage locations of the grains (256Kb) are randomly scattered and would benefit from a defragmentation operation.

Figure 4:
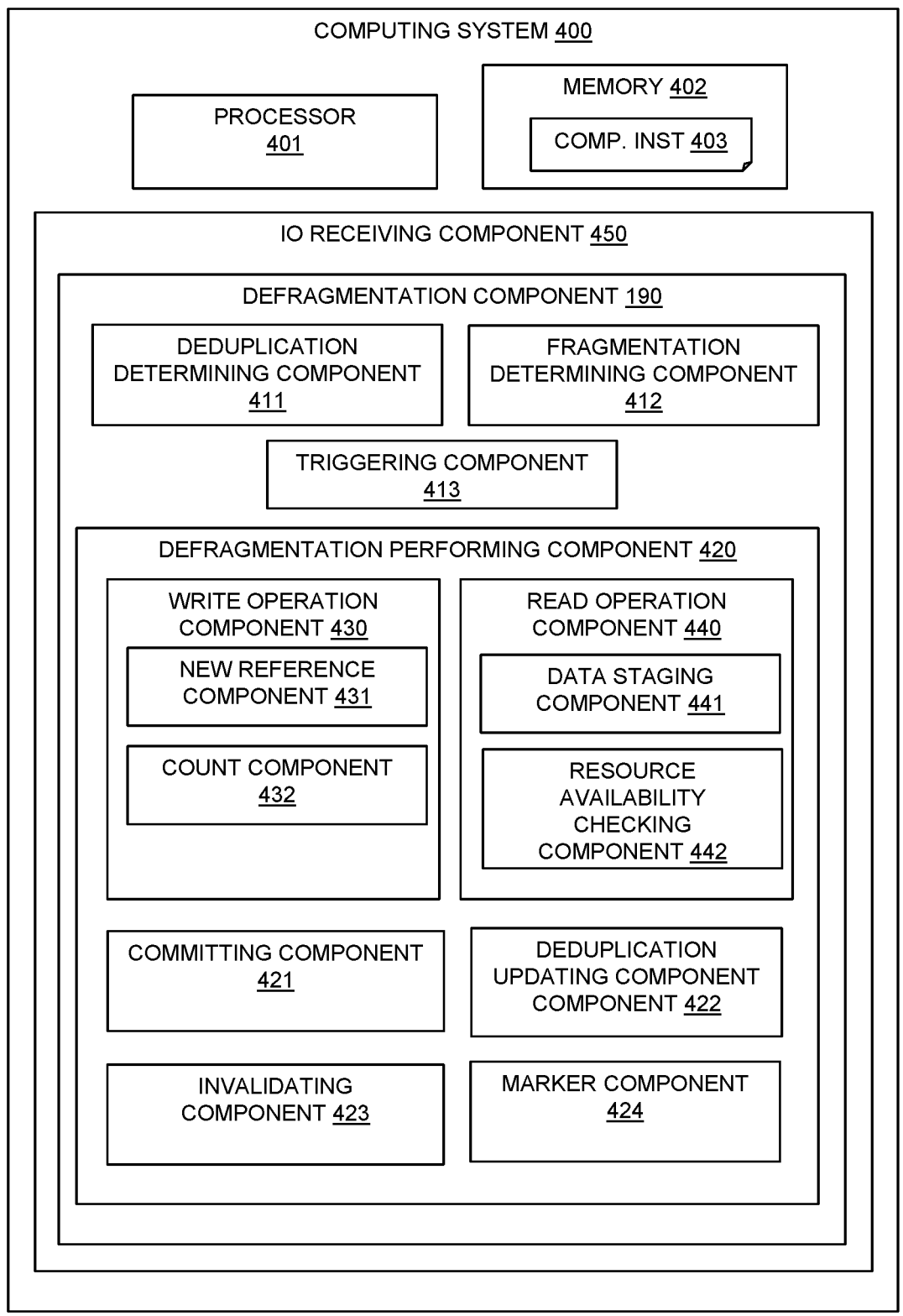
FIG. 4 is block diagram of an example embodiment of a system in accordance with the present invention.

Referring to FIG. 4, a block diagram shows an example embodiment of computing system 400 including the described defragmentation component 190.

The computing system 400 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The defragmentation component 190 may include a deduplication determining component 411 for determining using deduplication metadata that at least some of an incoming input/output (JO) stream is a duplicate of at least part of a source volume. The deduplication determining component 411 determines from deduplication metadata that a plurality of adjacent write chunks in the incoming IO stream are duplicates of a same source volume.

The defragmentation component 190 may include a fragmentation determining component 412 for determining using logical address metadata that the physical locations of the part of the source volume are fragmented in backend storage. The fragmentation determining component 412 determines from logical address metadata that the physical locations of multiple chunks of the source volume are randomly scattered in backend storage.

The defragmentation component 190 may be integrated into an IO receiving component 450 for receiving a host IO operation stream. The defragmentation component 190 may also include a triggering component 413 for triggering the system when suitable incoming IO operation streams are detected, which may be according to configurable thresholds.

The defragmentation component 190 may include a defragmentation performing component 420 for performing defragmentation of the stored data by using the incoming IO stream to write the data into sequential chunks at new physical locations in the backend storage and updating the source volume location mappings to the new physical locations.

The defragmentation performing component 420 may include a write operation component 430 for handling an incoming IO stream in the form of an incoming write stream and including a new reference component 431 for keeping existing source volume locations for write chunks and adding new reference volume locations for write chunks of the incoming write stream referencing the source volume locations for the write chunks and a count component 432 for incrementing a count of references to the existing source volume location.

The defragmentation performing component 420 may include a read operation component 440 for handling an incoming IO stream in the form of an incoming read stream and including a data staging component 441 for writing the data of the incoming read stream from staged node memory used during the read operations and a resource availability checking component 442 for checking if resources are available for defragmentation to be performed for an incoming read stream.

The defragmentation performing component 420 may also include: a committing component 421 for committing a chunk write to a new backend storage location sequentially with any previous write chunks of the stream; a deduplication updating component 422 for updating deduplication metadata to map an existing source volume location for the chunk to the new backend storage location for the chunk; and an invalidating component 423 for invalidating the previous backend storage location for the existing source volume location.

The defragmentation performing component 420 may also include a marker component 424 for adding markers to the deduplication metadata to indicate a plurality of data chunks in a single sequence, such that subsequent writes do not remove the data or only chose to move it if longer sequential data streams are detected.

Figure 5:
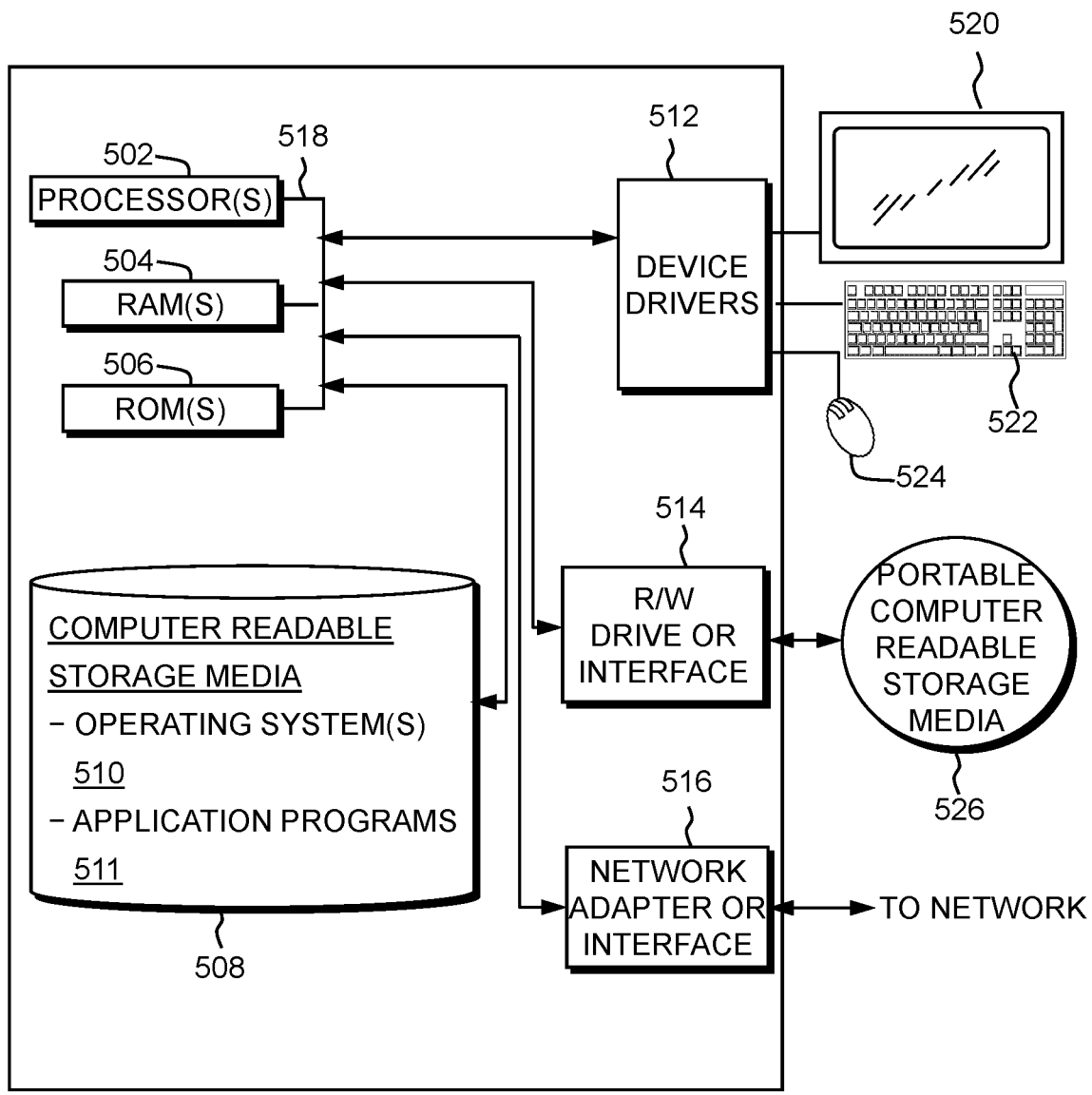
FIG. 5 is a block diagram of an embodiment of a computer system or cloud server in which the present invention may be implemented.

FIG. 5 depicts a block diagram of components of a computing system as used for the virtualizing storage controller system 120, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

The computing system can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 514 to read from and write to one or more portable computer readable storage media 526. Application programs 511 on the computing system can be stored on one or more of the portable computer readable storage media 526, read via the respective R/W drive or interface 514 and loaded into the respective computer readable storage media 508.

The computing system can also include a network adapter or interface 516, such as a TCP/IP adapter card or wireless communication adapter. Application programs 511 on the computing system can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

The computing system can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
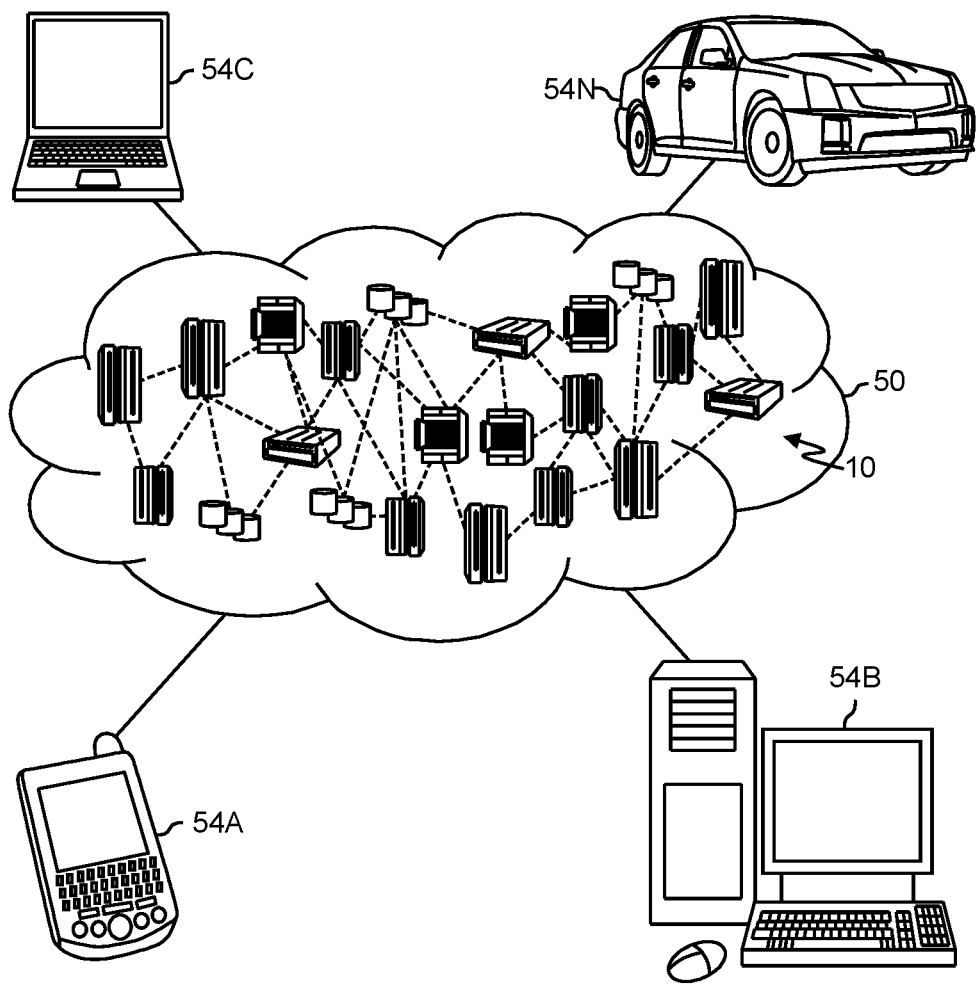
FIG. 6 is a schematic diagram of a cloud computing environment in which the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
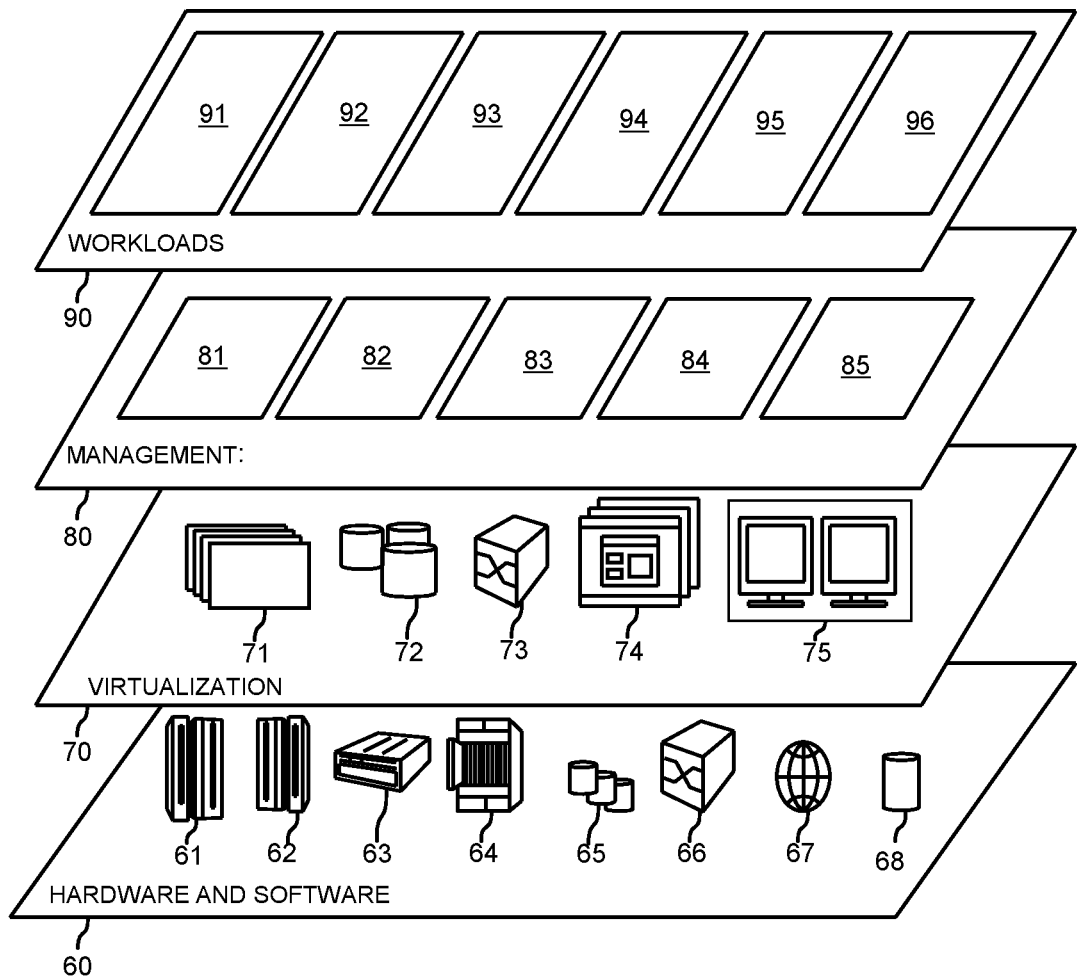
FIG. 7 is a diagram of abstraction model layers of a cloud computing environment in which the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage defragmentation processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for defragmentation in deduplication storage systems comprising:
    determining, by reading data on incoming input/output (IO) stream of data having multiple chunks of data, that at least some of the incoming input/output stream is a duplicate of at least part of a source volume based, at least in part, on deduplication metadata;
    determining that the physical locations of the part of the source volume are fragmented in backend storage based, at least in part, on logical address metadata; and
    defragmenting the stored data by:
        staging the read data in a node memory;
        using the incoming IO stream to write the staged read data into sequential chunks at new physical locations in the backend storage with any previous chunks of the stream of data, and
        updating the source volume location mappings to the new physical locations.

2. The computer-implemented method of claim 1, wherein:
the incoming IO stream is an incoming write stream; and
defragmenting further includes keeping existing source volume locations for write chunks and adding new reference volume locations for write chunks of the incoming write stream referencing the source volume locations for the write chunks.

3. The computer-implemented method of claim 1, wherein:
the incoming IO stream is an incoming read stream; and
defragmenting further includes writing the data of the incoming read stream from staged node memory used during the read operations.

4. The computer-implemented method of claim 3, wherein
defragmentation is performed for an incoming read stream when resources are available.

5. The computer-implemented method of claim 1, further comprising:
determining that a plurality of adjacent write chunks in the incoming IO stream are duplicates of a same source volume based, at least in part, on deduplication metadata.

6. The computer-implemented method of claim 1, further comprising:
determining that the physical locations of multiple chunks of the source volume are randomly scattered in backend storage based, at least in part, on logical address metadata.

7. The computer-implemented method of claim 1, wherein
defragmenting includes for each deduplication-sized chunk in the incoming IO stream:
committing a chunk write to a new backend storage location sequentially with any previous write chunks of the stream;
updating deduplication metadata to map an existing source volume location for the chunk to the new backend storage location for the chunk; and
invalidating the previous backend storage location for the existing source volume location.

8. The computer-implemented method of claim 7, further comprising:
providing a new reference volume location for a write chunk and referencing the existing source volume location for the chunk in the deduplication metadata; and
incrementing a count of references to the existing source volume location.

9. The computer-implemented method of claim 1, wherein the computer-implemented method is integrated into receiving a host IO operation stream and is triggered when suitable incoming IO operation streams are detected.

10. The computer-implemented method of claim 1, further comprising:
adding markers to the deduplication metadata to indicate a plurality of data chunks in a single sequence such that subsequent writes do not remove the data or only chose to move it if longer sequential data streams are detected.

11. The computer-implemented method of claim 1, wherein the incoming write stream is a sequential copy of a volume.

12. A computer system for defragmentation in deduplication storage systems comprising:
one or more computer processors;
a computer readable storage medium; and
computer code stored on the computer readable storage medium, with the computer code including instructions for causing the one or more computer processors to perform operations including the following:
determining, by reading data on incoming input/output (IO) stream of data having multiple chunks of data, that at least some of the incoming input/output stream is a duplicate of at least part of a source volume based, at least in part, on deduplication metadata,
determining that the physical locations of the part of the source volume are fragmented in backend storage based, at least in part, on logical address metadata, and
defragmenting the stored data by:
staging the read data in a node memory;
using the incoming IO stream to write the staged read data into sequential chunks at new physical locations in the backend storage with any previous chunks of the stream of data, and
updating the source volume location mappings to the new physical locations.

13. The computer system of claim 12, wherein:
the incoming IO stream is an incoming write stream; and
defragmenting further includes keeping existing source volume locations for write chunks and adding new reference volume locations for write chunks of the incoming write stream referencing the source volume locations for the write chunks.

14. The computer system of claim 12, wherein:
the incoming IO stream is an incoming read stream; and
defragmenting further includes writing the data of the incoming read stream from staged node memory used during the read operations.

15. The computer system of claim 14, wherein defragmentation is performed for an incoming read stream when resources are available.

16. The computer system of claim 12, wherein defragmenting includes for each deduplication-sized chunk in the incoming IO stream:
committing a chunk write to a new backend storage location sequentially with any previous write chunks of the stream;
updating deduplication metadata to map an existing source volume location for the chunk to the new backend storage location for the chunk; and
invalidating the previous backend storage location for the existing source volume location.

17. The computer system of claim 16, wherein the computer code further includes instructions for causing the one or more computer processors to perform the following:
providing a new reference volume location for a write chunk and referencing the existing source volume location for the chunk in the deduplication metadata; and
incrementing a count of references to the existing source volume location.

18. The computer system of claim 12, wherein the computer system is integrated into an IO receiving component for receiving a host IO operation stream and is triggered when suitable incoming IO operation streams are detected.

19. The computer system of claim 12, wherein the computer code further includes instructions for causing the one or more computer processors to perform the following:
adding markers to the deduplication metadata to indicate a plurality of data chunks in a single sequence such that subsequent writes do not remove the data or only chose to move it if longer sequential data streams are detected.

20. A computer program product for defragmentation in deduplication storage systems, the computer program product comprising:
- a computer readable storage medium; and
- computer code stored on the computer readable storage medium, with the computer code including instructions for causing one or more processors to perform operations including the following:
  - determining, by reading data on incoming input/output (IO) stream of data having multiple chunks of data, that at least some of the incoming input/output stream is a duplicate of at least part of a source volume based, at least in part, on deduplication metadata,
  - determining that the physical locations of the part of the source volume are fragmented in backend storage based, at least in part, on logical address metadata, and
  - defragmenting the stored data by:
    - staging the read data in a node memory;
    - using the incoming IO stream to write the staged read data into sequential chunks at new physical locations in the backend storage with any previous chunks of the stream of data, and
    - updating the source volume location mappings to the new physical locations.

* * * * *